United States Patent
Rivard

(10) Patent No.: US 11,087,122 B1
(45) Date of Patent: Aug. 10, 2021

(54) METHOD AND SYSTEM FOR PROCESSING CANDIDATE STRINGS DETECTED IN AN IMAGE TO IDENTIFY A MATCH OF A MODEL STRING IN THE IMAGE

(71) Applicant: MATROX ELECTRONIC SYSTEMS LTD., Dorval (CA)

(72) Inventor: Dominique Rivard, Dorval (CA)

(73) Assignee: MATROX ELECTRONIC SYSTEMS LTD., Dorval (CA)

( * ) Notice: Subject to any disclaimer, the term of this patent is extended or adjusted under 35 U.S.C. 154(b) by 292 days.

(21) Appl. No.: 16/388,528

(22) Filed: Apr. 18, 2019

Related U.S. Application Data

(62) Division of application No. 15/383,257, filed on Dec. 19, 2016, now Pat. No. 10,296,788.

(51) Int. Cl.
*G06K 9/34* (2006.01)
*G06K 9/00* (2006.01)

(52) U.S. Cl.
CPC ..... *G06K 9/00442* (2013.01); *G06K 2209/01* (2013.01)

(58) Field of Classification Search
CPC .............. G06K 9/00442; G06K 2209/01
See application file for complete search history.

(56) References Cited

U.S. PATENT DOCUMENTS

| | | | |
|---|---|---|---|
| 5,313,527 A | 5/1994 | Guberman et al. | |
| 5,748,807 A * | 5/1998 | Lopresti | G06K 9/03 382/310 |
| 8,195,626 B1 * | 6/2012 | Goodwin | G06F 16/1744 707/693 |
| 8,306,356 B1 * | 11/2012 | Bever | G06K 9/723 382/275 |
| 9,361,531 B2 | 6/2016 | Stella | |
| 9,621,714 B2 | 4/2017 | Seyfetdinov | |
| 10,438,083 B1 * | 10/2019 | Rivard | G06K 9/3258 |

(Continued)

OTHER PUBLICATIONS

"COMPGED Function", Functions and CALL Routines: COMPGED Function-9.2, <http://support.sas.com/documentation/cdl/en/lrdict/64316/HTML/default/viewer.htm#a002206133.htm>, retrieved Dec. 19, 2016, 6 pages.

(Continued)

*Primary Examiner* — Solomon G Bezuayehu
(74) *Attorney, Agent, or Firm* — Nicholson De Vos Webster & Elliott LLP

(57) ABSTRACT

A minimum edit cost is representative of a cost of edit operations performed on a candidate string detected in an image to satisfy characteristics of a model string. An attempt to perform a minimum edit cost between the candidate string and the model string is performed. Upon determining that the candidate string includes a blank character at a first character position between two consecutive non-blank candidate characters, and in response to determining that there is a non-blank model character at a second character position of the model string and that the second character position is associated with the first character position of the blank character in the candidate string, an indication that the minimum edit cost between the candidate string and the model string cannot be computed and that the candidate string is not a match to the model string is output.

24 Claims, 10 Drawing Sheets

(56) References Cited

U.S. PATENT DOCUMENTS

| | | | |
|---|---|---|---|
| 2002/0021838 A1* | 2/2002 | Richardson | G06F 40/221 |
| | | | 382/181 |
| 2007/0237401 A1 | 10/2007 | Coath et al. | |
| 2011/0090253 A1* | 4/2011 | Good | G06K 9/00671 |
| | | | 345/633 |
| 2012/0014612 A1* | 1/2012 | Fujiwara | G06K 9/00483 |
| | | | 382/218 |
| 2012/0070073 A1 | 3/2012 | Kompalli et al. | |
| 2013/0080164 A1 | 3/2013 | Zanolin et al. | |
| 2013/0243263 A1* | 9/2013 | Ishihara | G06K 9/00442 |
| | | | 382/112 |
| 2015/0227804 A1 | 8/2015 | Kobayashi et al. | |
| 2015/0269431 A1 | 9/2015 | Haji et al. | |
| 2016/0012288 A1 | 1/2016 | Goto et al. | |
| 2016/0063322 A1 | 3/2016 | Déjean et al. | |
| 2016/0292501 A1 | 10/2016 | Higashi et al. | |
| 2017/0004120 A1* | 1/2017 | Eck | G06F 40/289 |
| 2017/0046668 A1* | 2/2017 | Rowley | G06Q 20/36 |
| 2017/0161260 A1* | 6/2017 | Wang | G06F 40/30 |
| 2020/0184278 A1* | 6/2020 | Zadeh | G06F 16/953 |

OTHER PUBLICATIONS

"Neelemen-Wunsch algorithm", Wikipedia, the free encyclopedia, <https://en.wikipedia.org/wiki/Needleman-Wunsch_algorithm>, retrieved Aug. 17, 2016, 11 pages.

Non-Final Office Action from U.S. Appl/.No. 15/383,257, dated May 17, 2018, 12 pages.

Non-Final Office Action from U.S. Appl. No. 15/383,257, dated Sep. 20, 2018, 6 pages.

Notice of Allowance from U.S. Appl. No. 15/383,257, dated Dec. 31, 2018, 11 pages.

Requirement for Restriction/Election from U.S. Appl. No. 15/383,257, dated Mar. 21, 2018, 7 pages.

* cited by examiner

| | | Model String 216 | | | |
|---|---|---|---|---|---|
| | Model Character | 1 | BLANK | A-Z | 0-9 |
| | Character position j | 1 | 2 | 3 | 4 |
| | (0,0) | n/a | n/a | n/a | n/a |
| Candidate String 214D (14A5) / Candidate Character / 1 / 1 | $D_{214D}(1,0)$ | $D_{214D}(1,1)$ | n/a | n/a | n/a |
| 4 / 2 | $D_{214D}(2,0)$ | $D_{214D}(2,1)$ | $D_{214D}(2,2)$ | n/a | n/a |
| A / 3 | $D_{214D}(3,0)$ | $D_{214D}(3,1)$ | $D_{214D}(3,2)$ | $D_{214D}(3,3)$ | n/a |
| 5 / 4 | $D_{214D}(4,0)$ | $D_{214D}(4,1)$ | $D_{214D}(4,2)$ | $D_{214D}(4,3)$ | $D_{214D}(4,4)$ |

FIGURE 3A

| Candidate String 214B (118A5) | | Model String 216 | | | | |
|---|---|---|---|---|---|---|
| Character position i | Candidate Character | Model Character | 1 | BLANK | A-Z | 0-9 |
| | | Character position j | 1 | 2 | 3 | 4 |
| 1 | 1 | (0,0) | $D_{214B}(1,1)$ | n/a | n/a | n/a |
| 2 | - | $D_{214B}(2,0)$ | $D_{214B}(2,1)$ | $D_{214B}(2,2)$ | n/a | n/a |
| 3 | 8 | $D_{214B}(3,0)$ | $D_{214B}(3,1)$ | $D_{214B}(3,2)$ | $D_{214B}(3,3)$ | n/a |
| 4 | A | $D_{214B}(4,0)$ | $D_{214B}(4,1)$ | $D_{214B}(4,2)$ | $D_{214B}(4,3)$ | $D_{214B}(4,4)$ |
| 5 | 5 | $D_{214B}(5,0)$ | $D_{214B}(5,1)$ | $D_{214B}(5,2)$ | $D_{214B}(5,3)$ | $D_{214B}(5,4)$ |

FIGURE 3B

| Candidate String 214C (1 A5) | | Model String 216 | | | | |
|---|---|---|---|---|---|---|
| | Model Character | | 1 | BLANK | A-Z | 0-9 |
| Candidate Character | Character position i \ Character position j | (0,0) | 1 | 2 | 3 | 4 |
| 1 | 1 | $D_{214C}(1, 0)$ | n/a | n/a | n/a | n/a |
| blank | 2 | $D_{214C}(2, 0)$ | $D_{214C}(2, 1)$ | $D_{214C}(2,2)$ | n/a | n/a |
| A | 3 | $D_{214C}(3, 0)$ | $D_{214C}(3, 1)$ | $D_{214C}(3, 2)$ | $D_{214C}(3,3)$ | n/a |
| 5 | 4 | $D_{214C}(4, 0)$ | $D_{214C}(4, 1)$ | $D_{214C}(4, 2)$ | $D_{214C}(4, 3)$ | $D_{214C}(4,4)$ |

FIGURE 3C

| Candidate String 214A (1 A5) | | Model String 216 | | | | | |
|---|---|---|---|---|---|---|---|
| | | Model Character | | 1 | BLANK | A-Z | 0-9 |
| | Character position i | Character position j | | 1 | 2 | 3 | 4 |
| | 1 | | (0,0) | n/a | n/a | n/a | n/a |
| 1 | 1 | | $D_{214A}(1, 0)$ | $D_{214A}(1,1)$ | n/a | n/a | n/a |
| BLANK | 2 | | $D_{214A}(2, 0)$ | $D_{214A}(2, 1)$ | $D_{214A}(2,2)$ | n/a | n/a |
| A | 3 | | $D_{214A}(3, 0)$ | $D_{214A}(3, 1)$ | $D_{214A}(3, 2)$ | $D_{214A}(3,3)$ | n/a |
| S [5] | 4 | | $D_{214A}(4, 0)$ | $D_{214A}(4, 1)$ | $D_{214A}(4, 2)$ | $D_{214A}(4, 3)$ | $D_{214A}(4,4)$ |

FIGURE 3D

|  | | Model String 516 (2K((A-Z)(0-9)) | | | | |
|---|---|---|---|---|---|---|
| | | Model Character | 2 | K | A-Z | 0-9 |
| Candidate String 514A (2 M7) | Character position j | (0,0) | 1 | 2 | 3 | 4 |
| Candidate Character | Character position i | | | | | |
| 2 | 1 | $D_{514A}(1, 0)$ | $D_{514A}(1,1)$ | n/a | n/a | n/a |
| BLANK | 2 | $D_{514A}(2, 0)$ | n/a | n/a | n/a | n/a |
| M | 3 | $D_{514A}(3, 0)$ | n/a | n/a | n/a | n/a |
| 7 | 4 | $D_{514A}(4, 0)$ | n/a | n/a | n/a | n/a |

FIGURE 5

METHOD AND SYSTEM FOR PROCESSING CANDIDATE STRINGS DETECTED IN AN IMAGE TO IDENTIFY A MATCH OF A MODEL STRING IN THE IMAGE

CROSS-REFERENCE TO RELATED APPLICATIONS

This application is a divisional of application Ser. No. 15/383,257, filed Dec. 19, 2016, which is hereby incorporated by reference.

FIELD

Embodiments of the invention relate to the field of image processing, and more specifically, to the processing of candidate strings resulting from optical character recognition performed on an image.

BACKGROUND

Optical Character Recognition (OCR) generally refers to the mechanism of converting images of typed, handwritten or printed text into machine-encoded text (e.g., American Standard Code for Information Interchange (ASCII)), whether from a scanned document, a photo of a document, a scene-photo (e.g., an image acquired from a surveillance camera including a license plate number) or from subtitle text in an image (e.g., closed captioning text). Generally, an OCR mechanism is a computer-implemented process that includes the steps of acquiring an image containing a string of characters to be recognized, recognizing individual characters in the input image as characters of an alphabet, segmenting the characters into one or more strings of characters, performing a string recognition mechanism to return a corresponding output string of characters that corresponds to one or more model strings that are searched in the image (e.g., license plate, serial numbers, postal codes, addresses, etc.).

OCR has a wide range of applications including the recognition of vehicle license plate numbers (e.g., for use in automated traffic law enforcement, surveillance, access control, tolls, etc.), the recognition of serial numbers on parts in an automated manufacturing environment, the recognition of labels on packages (e.g., pharmaceutical packaging, food and beverage packaging, household and personal products packaging, etc.), and various document analysis applications.

Despite sophisticated OCR techniques, OCR errors frequently occur due to the non-ideal conditions of image acquisition, the partial occlusion or degradation of the depicted characters, and especially the structural similarity between certain characters (e.g., Z and 2, 0 and D, 1 and I). For example, the recognition of vehicle license plate numbers must overcome lighting conditions that are both variable (according to the time of day, weather conditions, etc.) and non-uniform (e.g., due to shadows and specular reflection), perspective distortion, and partial occlusion or degradation of the characters (e.g., due to mud, wear of the paint, etc.).

To improve the overall performance of OCR systems, a post-processing stage is performed, during which OCR errors are automatically detected and corrected. A popular technique to automatically correct errors in words is "dictionary lookup": an incorrect word, that is, one that does not belong to a predefined "dictionary" of valid words, is replaced by the closest valid word in the dictionary. This is often achieved by selecting the dictionary word yielding the minimum "edit distance" with the incorrect word. The edit distance between two strings is the minimum number of edit operations (deletions, insertions, and substitutions) needed to transform the first string into the second string. In some techniques, the edit distance has been generalized to an edit cost by assigning a weight to an edit operation according to the type of operation, the character(s) of the alphabet involved in the operation and/or recognition scores.

Methods of automatic string correction based on the dictionary lookup paradigm are useful in cases where valid input strings are those belonging to a limited dictionary of valid strings. However, they are inadequate to correct strings that are not of the word-type. There are an increasing number of OCR applications in which valid strings are not words but strings satisfying a "template" of some sort; such strings include vehicle license plate numbers, serial numbers, ID numbers, ZIP codes, etc. In particular, these strings may include non-blank characters (that belong to an alphabet, or a set of numbers), as well as space or blank characters between the non-blank characters which are not addressed by standard OCR and string correction techniques.

BRIEF DESCRIPTION OF THE DRAWINGS

The invention may best be understood by referring to the following description and accompanying drawings that are used to illustrate embodiments of the invention. In the drawings:

FIG. 3A illustrates an exemplary dynamic programming array (DPA) for performing dynamic programming to compute the minimum edit cost between a candidate string and a model string, in accordance with some embodiments.

FIG. 3B illustrates an exemplary dynamic programming array (DPA) for performing dynamic programming to compute the minimum edit cost between a candidate string 214B and a model string 216, in accordance with some embodiments.

FIG. 3C illustrates an exemplary dynamic programming array (DPA) for performing dynamic programming to compute the minimum edit cost between a candidate string 214C and a model string 216, in accordance with some embodiments.

FIG. 3D illustrates an exemplary dynamic programming array (DPA) for performing dynamic programming to compute the minimum edit cost between a candidate string 214A and a model string 216 when the candidate string and the model string include a blank at a corresponding location, in accordance with some embodiments.

FIG. 5 illustrates an exemplary dynamic programming array (DPA) for performing dynamic programming to compute the minimum edit cost between a candidate string 514A and a model string 516 when the candidate string includes a blank character, in accordance with some embodiments.

DESCRIPTION OF EMBODIMENTS

Figure 1:
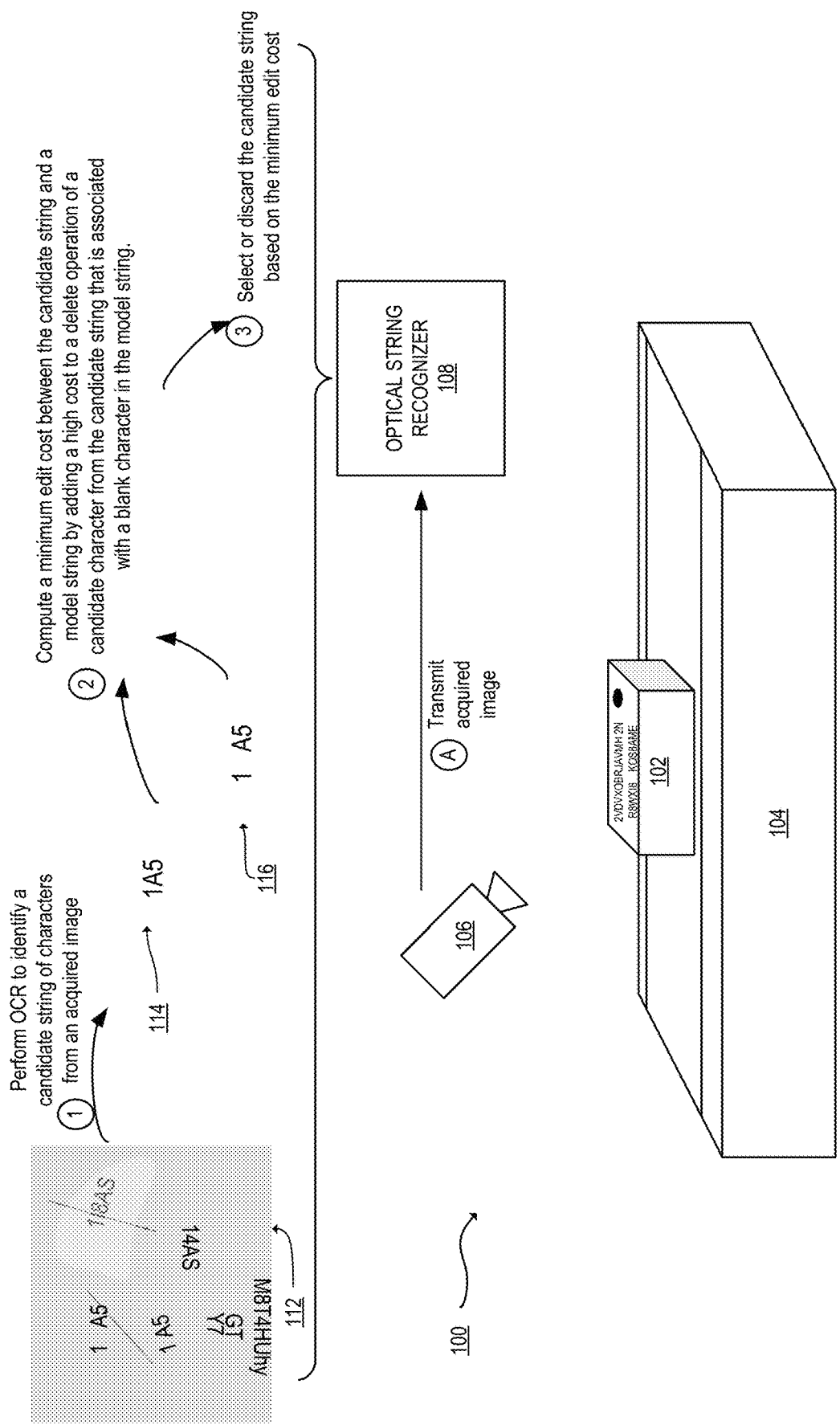
FIG. 1 illustrates a block diagram of an exemplary optical string recognition system 100 in accordance with some embodiments.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Throughout the following description similar reference numerals have been used to denote similar elements such as components, features of a system and/or operations performed in a system or element of the system, when applicable.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

There are an increasing number of OCR applications in which valid strings are not words but strings satisfying a "template" of some sort; such strings include vehicle license plate numbers, serial numbers, ID numbers, ZIP codes, etc. In particular, these strings may include non-blank characters (that belong to an alphabet, or a set of numbers), as well as space or blank characters between the non-blank characters.

In many OCR applications, a post-processing/disambiguation stage is performed following the detection of the characters and strings of characters to automatically detect and correct errors that may have occurred. A popular technique to automatically correct errors in words is "dictionary lookup": an incorrect word, that is, one that does not belong to a predefined "dictionary" of valid words, is replaced by the closest valid word in the dictionary. This is often achieved by selecting the dictionary word yielding the minimum "edit distance" with the incorrect word. The edit distance between two strings is the minimum number of edit operations (deletions, insertions, and substitutions) needed to transform the first string into the second string. In some techniques, the edit distance has been generalized to an edit cost by assigning a weight to an edit operation according to the type of operation, the character(s) of the alphabet involved in the operation and/or to recognition scores of the characters detected in the image with respect to model characters.

A blank character represents an empty space between a first non-blank character and a second non-blank character from an alphabet. This empty space typically does not include any data (or any relevant data) such that it is considered part of the background of an image. In traditional post processing mechanisms, a blank or space between two characters in a string is treated similarly to non-blank characters. For example, when two strings are compared, where one of the strings includes a blank at a position that corresponds to a position in the other strings with a non-blank character, a substitution is performed between the blank and the non-blank character. These mechanisms present several disadvantages. In image processing, a blank character or space at a location between two characters is a strong indication that the image does not contain any data at that location. By allowing substitution of a blank with a non-blank character, traditional post processing mechanisms force creation of data or alternatively the suppression of relevant data by a simple substitution operation. Typically a fixed cost may be assigned to the substitution operation that is independent of the characteristics of the blank or the character to be substituted by the blank. This can provide ambiguity in the determination of the best candidate string in an image that matches a searched model string in the image given.

The embodiments of the present invention describe methods and systems for processing candidate strings resulting from optical character recognition performed on images. In particular, the embodiments present mechanisms for determining accurate candidate strings that match a model string by taking into consideration blanks in either one of the candidate string or the model string. This is performed by providing an improved edit cost calculation computed between a model string and a candidate string.

In a first embodiment, a method and apparatus for identifying a match of a model string in an image, when the model string includes a blank, are described. An image is received. Optical character recognition is performed on the image to identify a candidate string of characters. The candidate string includes a plurality of candidate characters each having an associated position within the image. A minimum edit cost between the candidate string and a model string is determined. The model string includes a plurality of model characters and at least one blank model character located at a first character position between two consecutive non-blank model characters from the plurality of model characters. The minimum edit cost is representative of a cost of edit operations performed on the candidate string to satisfy characteristics of the model string. The determination of the minimum edit cost includes: in response to determining that there is a non-blank candidate character at a second character position of the candidate string and that the second character position is associated with the first character position of the blank model character in the model string, the following operations are performed: a cost of performing a delete operation of the non-blank candidate character from the candidate string is computed, a cost of performing an insert operation of a blank character in the candidate string at the second character position is computed, and the costs of deleting and inserting the blank are added to the minimum edit cost. The minimum edit cost is output to enable determination of whether the candidate string is a match for the model string in the image.

In a second embodiment, a method and apparatus for identifying a match of a model string in an image, when the candidate string includes a blank, are described. An image is received. Optical character recognition is performed on the image to identify a candidate string of characters. The candidate string includes a plurality of candidate characters each having an associated position within the image. A minimum edit cost between the candidate string and a model string is determined. The model string includes a set of model characters, and the minimum edit cost is representative of a cost of edit operations performed on the candidate string to satisfy characteristics of the model string. Determining the minimum edit cost includes: determining that the candidate string includes a blank character at a first character position between two consecutive non-blank candidate characters from the plurality of candidate characters, and in response to determining that there is a non-blank model character at a second character position of the model string and that the second character position is associated with the first character position of the blank character in the candidate string, an indication that the minimum edit cost between the candidate string and the model string cannot be computed and that the candidate string is not a match to the model string is output.

FIG. 1 illustrates a block diagram of an exemplary optical string recognition system 100 in accordance with some embodiments. The system 100 includes an image acquisition device 106 (such as a digital camera) that is operative to acquire one or more images of an object 102 in a scene. For example, the object 102 may be a product on a conveyor system 104 of a manufacture. The image is transmitted to the optical string recognizer 108 to be analyzed. The optical string recognizer 108 is operative to read and recognize text from the acquired image. The optical string recognizer 108 is implemented on an electronic device according to various embodiments as will be described in further details with reference to FIG. 7. While FIG. 1 illustrates a scene of a product inspection scenario in a manufacturing environment, the embodiments of the present invention are not limited to these types of use cases. For example, the invention can be used to recognize and read text in images from natural scenes, printed material or a sequence of images (e.g., pictures from a video stream). For example, optical string recognition can be performed to identify valid strings that are not words but strings satisfying a "template" of some sort; such strings include vehicle license plate numbers, serial numbers, ID numbers, ZIP codes, etc. In particular, these strings may include non-blank characters (that belong to an alphabet, or a set of numbers), as well as space or blank characters between the non-blank characters.

At operation (A), an image is transmitted to the optical string recognizer 108 to be processed. The image can be a grayscale image (e.g., image 112), in which each pixel of the image has an intensity value within a given range (e.g., between 0 and 255 when the pixel intensity is represented with 8 bits; between 0 and 65535 when the pixel intensity is represented with 16 bits; or other ranges when the pixel intensity is represented with a different number of bits). In some embodiments, an intensity value of 0 will indicate a black pixel while the maximum value (e.g., 255, 65535 or other) will indicate a white pixel, any other value within the minimum and the maximum value is a shade of grey. While image 112 appears to include white pixels, black pixels and grey pixels of a single shade of grey, other input images will typically include pixels with varying shades of grey. In some embodiments, the acquired image can be a color image (e.g., RGB). When the image is a color image, the optical string recognizer may be operative to convert the image into a grayscale image.

The optical string recognizer recognizes text in an image by matching candidate strings that are extracted from the image with one or more model strings defined in a set-up stage. The results of this mechanism are output strings which correspond to candidate strings extracted from the image. The output strings are candidate strings that may have been modified in order to satisfy the characteristics of the model strings. The model strings may be defined in various manners. In one embodiment, a model string is defined as a sequence of predefined characters and spaces from a given alphabet (e.g., the user may be interested in identifying the following sequence of characters "983 8K7," or any other set of successive predefined characters). One possible alphabet is the set of characters A-Z and numerals 0-9, though other alphabets can also be used. In some embodiments, an output string S satisfies a model string if the output string and the model string are of the same length and if each character of the output string is the same as the character at the corresponding character position in the model string.

Alternatively in some embodiments, the model string may be a template for an output string as opposed to successive predefined characters. In an embodiment, a template T for an output string has multiple character positions, each character position j being associated with a character set $C_j$. Thus, template T can be represented as a sequence of M character sets $C_j$:

$$T=C_1C_2\ldots C_M$$

Each character set $C_j$ consists of a set of allowable characters for the respective character position j in the output string, where this set of allowable characters is for example a subset of an alphabet. One possible alphabet is the set of characters A-Z and numerals 0-9, though other alphabets can also be used. A character set can consist of a single character of an alphabet, several characters of an alphabet, or all characters of an alphabet. According to this embodiment, a string S preferably satisfies a template T if the string and the template are of the same length and if each character of the string belongs to the character set at the corresponding character position in the template. The string S may further include at a character position a blank character. In some embodiments, at each character position the string S can include either a blank character or alternatively a set of allowable non-blank characters.

In a variant embodiment, a template may consist of a sequence of character sets $C_j$ of variable length. The template may have a minimum length $L_{min}$ and a maximum length $L_{max}$, and a character set $C_j$ is defined for each position j in the template in the range $[1, L_{max}]$:

$$T=C_1C_2\ldots C_{Lmin}\ldots C_{Lmax}$$

According to this variant embodiment, a string S preferably satisfies a template T if the length of the string belongs to the range $[L_{min}, L_{max}]$ defined by the minimum and maximum lengths of the template and if each character of the string belongs to the character set at the corresponding character position in the template.

In some embodiments, the operations of defining the model strings are performed during a set-up or pre-processing stage. In addition to the definition of the model strings, the set-up stage can include the definition of other selection criteria for the string to locate in an image. For example, a number of strings to be located can be defined, positions of the strings relative to one another, positions of the strings in the image, the font of the characters that form the model strings, etc. For example, a number of output strings to be read in an image, one or more model strings for each output string, and optionally, information on the order in which the strings should appear in the image, can be defined. In some embodiments, the parameters and selection criteria for defining the strings to be located in an image can be entered by a user through a graphical user interface. The user can be prompted to define the model strings, positions of the strings relative to one another, and any other information for defining the strings to be located in an image. In some embodiments, instead of being input to the optical string recognizer as parameters by a user, the number of strings, model strings and other related selection criteria can be preconfigured (e.g., hardcoded) in the optical string recognizer 108 (e.g., when the optical string recognizer is provided as a stand-alone pre-configured optical string recognizer system).

Referring back to FIG. 1, when the image is acquired, at operation (1), the optical string recognizer 108 performs optical character recognition on the acquired image 112 to identify a candidate string of characters (e.g., string 114 "1A5"). At operation (2) the optical string recognizer 108 computes a minimum edit cost between the candidate string and a model string. As will be described in further details, when the candidate string includes a non-blank character at a corresponding position of a blank character in the model string, the minimum edit cost includes a cost of a delete operation of the non-blank character which increases the cost and consequently is likely to cause the candidate string to be discarded as an output string in the image. Alternatively, when the candidate string includes a blank character at a corresponding position of a non-blank character in the model string, the optical string recognizer 108 may discard the candidate string immediately. In some embodiments, when the candidate string includes a blank character at a corresponding position of a non-blank character in the model string, the optical string recognizer 108 allows for a single insertion of a character with an associated cost in order to match the model string.

At operation (3), the optical string recognizer selects or discards the candidate string based on the obtained minimum edit cost. As will be described in further details below, the determination of whether to select or discard the string can be performed based upon a comparison between edit costs associated with multiple candidate strings within the image. In some embodiments, the candidate string with the smallest minimum edit distance can be selected. In other embodiments, the determination of whether to select or discard the candidate string can be performed based upon a comparison of the minimum edit cost of the string with a range of acceptable minimum edit costs. If the minimum edit cost of the candidate string falls outside the range of acceptable values, the candidate string is discarded. In the embodiments presented herein, the occurrence of a blank character (i.e., a space between two characters) provides relevant information about the model string and/or the candidate string that enables the optical string recognizer to accurately detect erroneous candidate strings that do not match the model string and discard them.

Figure 2:
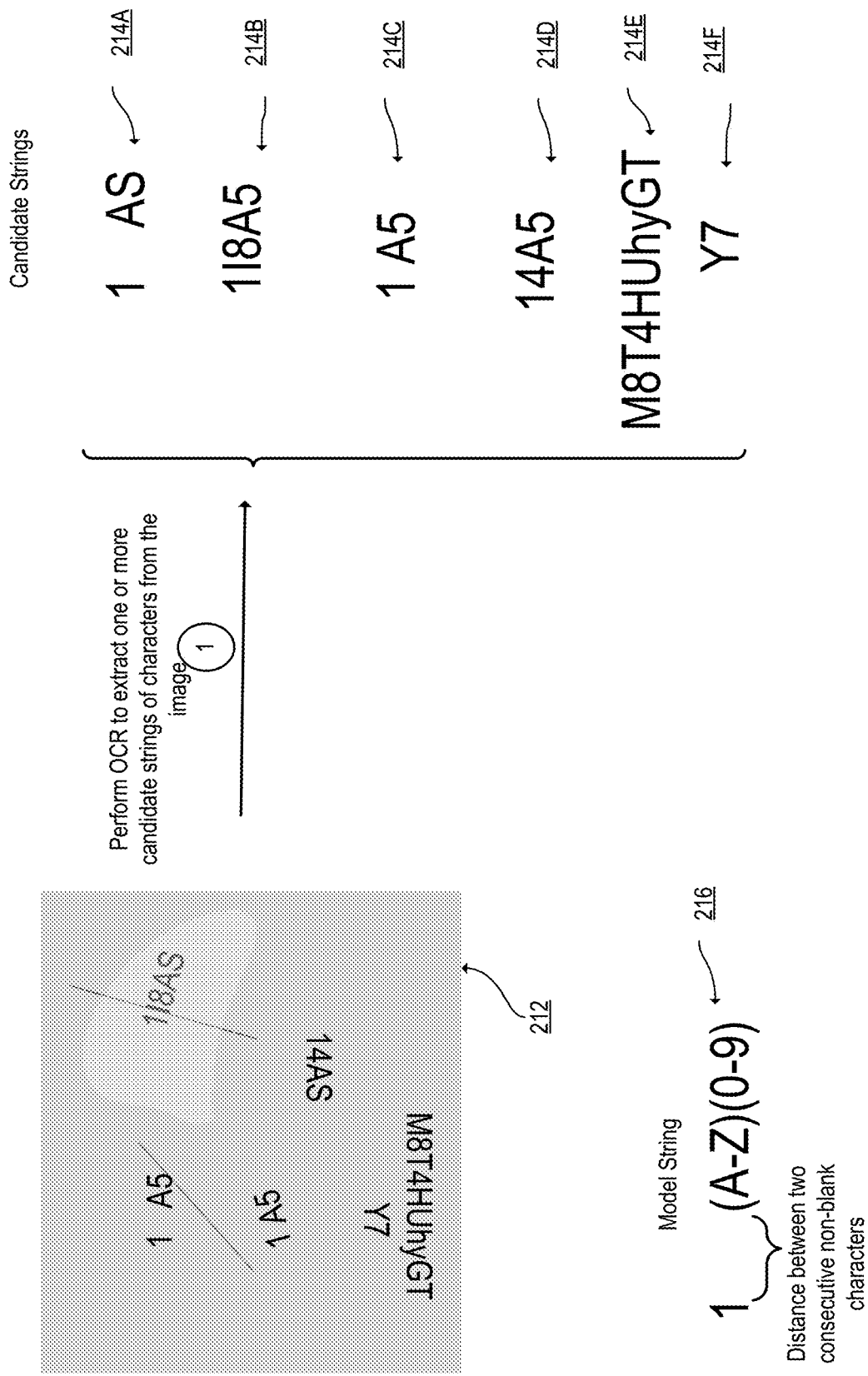
FIG. 2 illustrates an exemplary image and candidate strings extracted from the image following the optical character recognition, in accordance with some embodiments.

FIG. 2 illustrates an exemplary image and candidate strings extracted from the image following optical character recognition, in accordance with some embodiments. In FIG. 2, an exemplary model string 216 is defined. The model string 216 includes three non-blank characters: the character 1 at a first position, a character from a character set (A-Z) at a third position, and a character from another character set (0-9) at a fourth position. The string 216 further includes a blank character or space at a second position in the string, between the two non-blank characters at the first position and the third position in the string. While the space may not be considered a character part of an alphabet, it is referred to herein as a blank character for facilitating the discussion below.

In some embodiments, the model string 216 can be defined by a set of machine-encoded text such that each character (including the blank character) has an associated code. In other embodiments, the model string 216 is defined based on an acquired image (e.g., an image representative of a typical scene in which strings are to be detected). OCR is performed on this image (model image) during the set-up stage to extract the characters of the string and to identify them with a position and corresponding machine-encoded text. The machine-encoded text is then used at a run time phase to locate strings that satisfy the characteristics of the model string in another image.

In general, a blank character refers to an empty space between two consecutive non-blank characters which satisfies a predetermined distance between the two consecutive characters. For example, a minimum length and a maximum length of the blank character are defined for a model string (e.g., string 216). Thus, when a space between two non-blank candidate characters is detected in an image, it needs to satisfy the following conditions in order to be considered a valid blank character as defined in the model string: the distance between the two consecutive candidate characters needs to be greater than the minimum length of the blank in the model string, while being smaller than the maximum length of the blank in the model string. The non-limiting exemplary model string 216 will be used herein for discussing the various embodiments of the invention, however other model strings (e.g., predefined consecutive characters, or template of output string) can be used without departing from the scope of the present invention.

FIG. 2 further illustrates an image 212. Following the acquisition of the image, OCR is performed to identify one or more candidate strings of characters. The candidate strings 214A-F are identified. OCR can be performed according to various techniques. Typically a first step of extracting candidate characters that match model characters is performed, followed with a second step of segmenting the candidate characters into multiple strings. In various embodiments, at the stage of extraction of the candidate characters, each identified candidate character is a potential match in the image for a character model. Each candidate character has associated information such as a reference to the particular character model that was matched, a position in the target image where the particular model character was matched, and a recognition score associated with the OCR process. For example, a position may consist of the coordinates (x,y) of a pixel where x,y may be integer or non-integer values (providing for sub-pixel accuracy).

In some embodiments, the OCR performed on the image 212 identifies a candidate character that "matches" a respective character model by determining a recognition score between the model character and the candidate character. In such embodiments, a recognition score may be a measure indicative of a degree of similarity between the candidate character and the model character. In a specific, non-limiting example of implementation, the OCR process applies matrix matching to compare character models (defined in respective model images) on a pixel-by-pixel basis with candidate characters in the image 212 (i.e., "pattern matching" or "pattern recognition" or "image correlation") and uses a normalized correlation algorithm to determine recognition scores between characters identified in the image 212 and the defined character models. Note however that different types of OCR processes and algorithms exist and may be used to identify candidate characters in an image and/or to determine recognition scores, without departing from the scope of the present invention.

In some embodiments, a recognition score is determined by comparing values of pixels in the image with values of pixels in a model image including the model characters, for example, using normalized grayscale correlation. In other embodiments, a recognition score is determined by extracting a set of features from the model, extracting a similar set of features from the acquired image, and then determining associations between the feature sets of the model and the acquired image. For example, the set of features can be the coordinates of edge points, interest points or other local features, and determining associations can be performed using a geometric hashing, Hough transform, or generalized Hough transform technique. In other embodiments, a recognition score is determined by extracting a feature vector from the acquired image and model image, respectively, and then determining a score (e.g., based on a Euclidean distance) between the acquired and model feature vectors.

In some embodiments, an OCR process based on artificial intelligence can be employed. In this case, a recognition score may be a measure of the likelihood that a portion of the image corresponds to a particular character model determined based on samples provided for the character model during a training stage.

In some embodiments, an OCR process further identifies blank characters (spaces) between two characters. A blank character is identified when a distance between two consecutive non-blank characters is greater than a minimum length defined for a blank character of a model string, and is smaller than a maximum length defined for a blank character of the model string. For example, the OCR process may determine a position of each non-blank character within the image and determine the distance between the respective positions in the image. According to this distance, a determination is performed as to whether there is a blank character or not between the two non-blank characters. In some embodiments, each non-blank character extracted in an image is further included within a bounding box that is oriented according to the orientation of the character as detected in the image. In these embodiments, a determination is performed of whether there is a blank character between two non-blank characters based on the distance between the two respective bounding boxes of the non-blank characters when compared to the minimum length and maximum length defined for the blank character of the model string.

Note that various techniques exist and may be used for establishing recognition scores between character models and characters in an image. Furthermore, the assessed recognition scores for the image may be manipulated in different, known ways to ascertain whether or not matches have been identified between character models and the image. In one example, the OCR process may define a match between a certain character in the image and the model image of a particular character model if the determined recognition score therebetween is greater than a predefined threshold, in which case that certain character is identified as a candidate character in the target image. In another embodiment, all matches are returned as candidate characters regardless of their recognition scores.

In some embodiments, the OCR process may identify more than one candidate character at substantially the same position within the image. Each candidate character is associated with a respective recognition score. For example, in a non-limiting example, an OCR process may identify a character with a "5" and further identify an "S" at substantially the same location in an image. In some embodiments, a set of candidate characters can be identified as a hierarchical set of candidate characters where candidate characters are ranked based on their recognition scores and their positional relationship. The hierarchical set of candidate characters may include a primary candidate character having the highest recognition score among the set and may include one or more secondary candidate characters having lower recognition scores. In some embodiments, a set of candidate characters can include an "associated" (or "exclusive") secondary candidate character that is exclusive to the set of candidate characters and a "non-associated" (or "non-exclusive") secondary candidate character that also belongs to another set of candidate characters. In some embodiments, the set of candidate characters can consist of an unordered set of candidate characters in which candidate characters within the set are not necessarily ordered based on recognition scores.

In one embodiment, when a candidate character (C) is extracted from the image 212, each one is associated with a position (x,y) of the match in the acquired image, and the recognition score RS and, optionally, related information such as the character model CMj that was matched and its label Lj. A segmentation operation is then performed to group and segment the candidate characters into candidate strings that include a set of one or more candidate characters. In some embodiments, the identification of the candidate strings is performed by determining whether a sequence of candidate characters, when grouped, satisfies a stringness criteria. In a specific, non-limiting example of implementation, the stringness criteria include an alignment criterion and an inter-character spacing criterion. For example, with reference to FIG. 2, each one of the extracted candidate strings satisfies the following criteria: the sequence of candidate characters within a string are substantially aligned, the distance between two consecutive non-blank characters of a candidate string is within a tolerable threshold distance.

The embodiments of the present invention are operative to identify candidate strings of characters that include blank characters between consecutive non-blank characters in order to satisfy the characteristics of the model string 216 that is searched in the image 212. While the embodiments are described with the optical string recognizer 108 performing the OCR mechanism, in other embodiments, the OCR can be performed externally to the optical string recognizer 108. In these embodiments, the optical string recognizer 108 is operative to receive a set of one or more candidate strings. These characters are extracted from an image as a result of OCR and are associated with additional information related to the image. Each candidate string being associated with a sequence of candidate character positions with a respective candidate character at that position. For example, in some embodiments, the received candidate strings include for each candidate character position j a reference to one or more candidate characters detected in the image, and, optionally, related information for each candidate character such as the character model CMj that was matched and its label Lj, a position Xj of the match in the acquired image, and the recognition score RSj. In other embodiments, the optical string recognizer (OSR) 108 is operative to perform at least the segmentation stage of the OCR. In these embodiments, the OSR 108 receives a set of characters as a result of a character extraction within the image 212 and segments the characters into one or more strings based on the stringness criteria.

Referring back to FIG. 2, once a candidate string (214A-F) is output as a result of the OCR process, the OSR 108 determines a minimum edit cost of transforming this candidate string into an output string that satisfies characteristics of a model string. A computation of a minimum edit cost is performed based on costs of edit operations to be performed on the candidate string to transform it into the output string. In some embodiments, the minimum edit cost is a version of an edit distance between the candidate string and the model string. The minimum edit cost is a measure of the similarity of the two strings. Conventional edit distances are well known in the art (e.g., Levenshtein distance, weighted edit distance, etc.) and will not be discussed in further details herein.

In the embodiments of the present invention, and in contrast to traditional edit distance mechanisms, different operations and associated costs are defined depending on whether the character (on which the operation is to be applied) is a blank or a non-blank character. When a character is a non-blank character (e.g., a character from a known alphabet (A-Z) and/or (0-9), etc.), a set of allowable edit operations that can be performed on a non-blank candidate character includes a delete operation and a keep operation. The delete operation consists of deleting a non-blank candidate character of the candidate string or, in other words, deleting a character position in the candidate string. The keep operation consists of keeping a non-blank candidate character of a set of candidate characters of the candidate string. In some embodiments, the keep operation may include substituting a non-blank candidate character at a given position with another candidate. For example, in the embodiments where, at each candidate position, the candidate string includes a set of candidate characters, a keep operation may be performed by substituting a primary candidate character with a secondary candidate character at that position. While in the traditional computation of the minimum edit cost, the set of allowable edit operations further includes an insert operation, in the embodiments of the present invention, the insert operation is not allowed with the exception of the operation of inserting a blank character. In addition, in some embodiments, the insert_blank operation is performed when the candidate string satisfies certain conditions as it will be described in further details below. Each operation is associated with a cost. In the following discussion, the cost of deleting a character $M_k$ is referred to as $W_{del}(M_k)$, the cost of keeping the character $M_k$ is referred to as $W_{keep}(M_k)$, and the cost of inserting a blank character is referred to as $W_{insert\_blank}(M_k)$.

Various costs can be assigned to the different edit operations. In some embodiments, the cost of an edit operation is identical for any non-blank character $M_k$ such that the cost of performing the operation is independent of the character. In other embodiments, the cost of an edit operation involving a particular non-blank candidate character $M_k$ is determined based on the recognition score $RS_k$ of the particular candidate character. According to an embodiment, the cost $W_{del}(M_k)$ of deleting a particular candidate character $M_k$ is proportional to the recognition score $RS_k$ of the non-blank candidate character such that a high recognition score results in a high cost for deleting the non-blank candidate character, and vice versa. In a non-limiting example where the recognition score $RS_k$ is a normalized value between 0 and 1, the cost of deleting the non-blank candidate character $M_k$ is determined as $W_{del}(M_k)=RS_k$. According to an embodiment, the cost of keeping a particular non-blank candidate character $M_k$ is inversely proportional or complementary to the recognition score $RS_k$ of the non-blank candidate character such that a high recognition score results in a low cost for keeping the candidate character, and vice versa. In a non-limiting example where the recognition score $RS_k$ is a number between 0 and 1, the cost of keeping the non-blank candidate character $M_k$ is determined as $W_{keep}(M_k)=1-RS_k$.

According to an embodiment, the cost of an edit operation involving a set of non-blank candidate characters $CC_i$ is determined based on the cost of an edit operation of a particular non-blank candidate character of the set of non-blank candidate characters $CC_i$. According to an embodiment, the cost of deleting a set of non-blank candidate characters $CC_i$ is determined as the maximum cost among the costs $W_{del}(M_k)$ of the set of non-blank candidate characters $CC_i$. In the case of an ordered or hierarchical set of non-blank candidate characters, this corresponds to the deletion of a primary or dominant non-blank candidate character (where the primary non-blank candidate character is associated with the highest recognition score at a given position among the set of potential candidate character $CC_i$ at that position). According to an embodiment, the cost of keeping a non-blank candidate character of a set of candidate characters $CC_i$ of the candidate string is determined as the minimum cost among the costs $W_{keep}(M_k)$ of the set of candidate characters $CC_i$.

When a character from the model string is a blank character (e.g., a space within the model string between two consecutive non-blank characters), a set of allowable edit operations that can be performed on a candidate string includes a delete operation, and a keep operation. In some embodiments, an insert_blank operation can also be allowed. As will be described with reference to the exemplary FIG. 2 and FIGS. 3A-D, the edit operations performed when a blank character is detected in a candidate string or in a model string are performed based on conditions that need to be satisfied. For example, a keep operation is performed when a blank character is located at corresponding positions in the candidate string and in the model string. A substitution operation (where a blank character can be replaced with a non-blank character) is not allowed. Further a delete operation to be performed on a non-blank character to obtain a blank character can be performed under certain conditions and can be associated with a high cost significantly increasing the cost of the minimum edit distance for the candidate string.

In some embodiments, determining a minimum edit cost of transforming the candidate string to satisfy characteristics of a model string includes determining "set costs" of performing various sets (or combinations) of edit operations on the candidate string and determining the minimum cost using the set costs. In some embodiments, determining a minimum edit cost is performed according to a dynamic programming algorithm. In some embodiments, once the minimum edit cost of transforming the candidate string to satisfy the characteristics of the model string is computed, an output string corresponding to the determined minimum edit cost is returned. In some embodiments, this is performed by determining the set of edit operations corresponding to the minimum edit cost, performing the set of edit operations (if any) on the candidate string to obtain a revised candidate string, and returning an output string corresponding to the revised candidate string. In an embodiment, the determination of a set of edit operations corresponding to the minimum edit cost comprises backtracking through the dynamic programming array, as known from existing string recognition systems. However, any suitable method may be used to determine the set of edit operations corresponding to the minimum edit distance between the candidate string and the model string, without departing from the scope of the present invention.

FIG. 3A illustrates an exemplary dynamic programming array (DPA) for performing dynamic programming to compute the minimum edit cost between a candidate string and a model string, in accordance with some embodiments. While the embodiments below will be described with respect to a dynamic programming array for implementing dynamic programming of the computation of a minimum edit cost between two strings, in other embodiments, the dynamic programming can be performed without the use of the dynamic programming array, without departing from the scope of the present invention. In FIG. 3A the minimum edit cost is determined between the candidate string 214D ("14A5") and the model string 216 ("1 (A-Z)(0-9)"). Each one of the candidate string and the model string has respective associated character positions. For example, the candidate string has 4 candidate character positions i=1 to 4, and corresponding candidate characters $CC_1$-$CC_4$. In some embodiments, as described above, in a candidate string, instead of a single candidate character there may be a set of multiple character candidates associated with the same position. For example, at position 4 while character $CC_4$=5 is detected with an associated recognition score $RS_{CC4}$, another character $CC_4'$ ("S") can also be detected with another recognition score $RS_{CC4'}$. When multiple candidate characters are recognized at a given position within a string, the candidate with the highest recognition score is used.

The dynamic programming array of FIG. 3A includes an array of cells. To determine the minimum edit cost, each cell (i,j) of the dynamic programming array is processed in turn, proceeding generally from the top-left cell (0,0) to the bottom right cell (4,4). For a given cell (i,j) corresponding to character position i and candidate character $CC_i$ of the candidate string and output character position j and model character $C_j$ of the model string 216, the minimum edit cost D(i,j) is determined.

When the candidate character at character position i and the model character at character position j are non-blank characters, proceeding from cell (i-1, j) to cell (i,j) is performed with a delete operation of the non-blank candidate character $CC_i$. The edit cost to proceed from cell (i-1,j) to cell (i,j) is the sum of D(i-1, j) and the cost of deleting the candidate character $CC_i$. In some embodiments, when the candidate character at the position i is a set of non-blank candidate characters $M_k$, as opposed to a single candidate character, the deletion cost is the maximum cost among the deletion costs $W_{del}$ ($M_k$) of the candidate characters $M_k$ belonging to the set of non-blank candidate characters $CC_i$.

In some embodiments, the deletion cost $W_{del}(M_k)$ of a non-blank candidate character $M_k$ is an increasing function of the recognition score $RS_k$, such as $W_{del}(M_k)=RS_k$. In some embodiments, the deletion cost is the deletion cost $W_{del}(M_k)=RS_k$ of the primary non-blank candidate character of the set of non-blank candidate characters $CC_i$. In other embodiments, the deletion cost $W_{del}(M_k)$ of a non-blank candidate character $M_k$ is independent of the recognition score. In some of these embodiments, the deletion cost can be a fixed cost for all non-blank candidate characters, while in other embodiments, the deletion cost can vary based on which non-blank candidate character is to be deleted.

In some embodiments, if an insert operation is allowed, an edit cost of proceeding from cell (i, j-1) and performing an insert operation on the candidate string is determined. The edit cost is the sum of D(i, j-1) and the cost of inserting a character into the candidate string at character position i. If the insert operation is not allowed, the edit cost can be set to a "not defined" value, such as a high value clearly outside the normal range for an edit cost. The edit cost of proceeding from cell (i-1, j-1) to cell (i,j) with a keep operation of a non-blank character is the sum of D(i-1, j-1) and the cost of the keep operation. Generally, the keep cost $W_{keep}$ ($M_k$) of a candidate character $M_k$ is a decreasing function of its recognition score $RS_k$, such as $W_{keep}(M_k)=1-RS_k$. If it is determined that a keep operation cannot be performed, the edit cost is set to a "not defined" value, such as a high value clearly outside the normal range for an edit cost. In other embodiments, the keep cost $W_{keep}(M_k)$ of a non-blank candidate character $M_k$ is independent of the recognition score. In some of these embodiments, the keep cost can be a fixed cost for all non-blank candidate characters, while in other embodiments, the keep cost can vary based on which non-blank candidate character is to be deleted. In some embodiments, when the position is associated with a set of candidate characters as opposed to a single candidate character, the cost of the keep operation is the minimum cost among the keep costs $W_{keep}(M_k)$ of the subset of candidate characters $M_k$ belonging to the set of candidate characters $CC_i$ that satisfy the character set $C_j$ and, optionally, the stringness criterion.

A minimum edit cost D(i,j) for a cell (i,j) is determined as the minimum cost among the edit costs determined for reaching the cell (i,j) by performing a keep, a delete and an insert operation (or a subset of these operations when not all operations are allowed). In some embodiments, the candidate string associated with cell (i,j) is modified, such that the minimum edit cost for subsequent cells is determined based on the modified candidate string (e.g., when determining an edit cost of proceeding from cell (i,j)). The embodiments of FIGS. 3A-D will be described with reference to a set of allowable edit operations which does not include an insert of a non-blank character in a candidate string. However, alternative embodiments may include the insert operation and a corresponding cost for performing the insert operation without departing from the scope of the present invention.

In the embodiments of the present invention, a model string may include a blank character (e.g., blank at the second position in the model string 216). While several paths and corresponding edit costs may be performed to determine the minimum edit cost between model string 216 and candidate string 214D within the DPA, only a subset of these operations and paths will be described in further details below in the intent of clarity.

When the cell (1,1) is reached in the DPA a minimum edit cost $D_{214D}$ (1,1) is calculated. Given that an insert operation is not allowed, the only path available to reach cell (1,1) from cell (0,0) is to perform a keep operation of candidate character $C_1$=1. Given that this operation is the first operation performed in the calculation of the minimum edit cost between the strings, the distance equals the cost of the keep operation (i.e., $D_{214D}$ (1,1)=$W_{keep}$("1")). Once the cell (1,1) is reached, the optical string recognizer 108 determines if it is possible to modify the candidate string in order to obtain the model character at position 2 of the model string 216 (i.e., the blank character) when originating from the cell (1,1).

The optical string recognizer 108 determines whether the candidate string includes at the corresponding position of the candidate string (i.e., here at the second position of the candidate string) a blank character. In the illustrated example of FIG. 3A, the candidate string 214D does not include a blank character at the second position. The candidate string 214D includes a non-blank character ("4") with an associated recognition score $RS_{214D}$("4"). When it is determined that a non-blank character in the candidate string is located at an associated position of a blank character of the model string, the optical string recognizer 108 does not allow the use of a keep/replace operation (which would otherwise lead to a replacement of the non-blank character with a blank character). Therefore in order to move from cell (1,1) to cell (2,2) the only operation that provides a potential path to reach the cell (2,2) (i.e., that enables the modification of the candidate string 214D into the model string 216) is a delete operation towards the cell (2,1). In FIG. 3A, the vertical arrow originating from the cell (1,1) towards the cell (2,1) represents the delete operation of the candidate character "4". The edit cost for proceeding from the cell (1,1) towards the cell (2,1) is $D_{214D}$ (1,1)+$W_{del}$ ("4").

In some embodiments, and as described above with reference to the delete operation of a non-blank candidate character, the deletion cost $W_{del}$("4") of the non-blank candidate character "4" (located at the second position of the candidate string 214D) is an increasing function of the recognition score $RS_{214D}$("4"). For example, $W_{del}$("4")=$RS_{214D}$("4"). In some embodiments, the deletion cost is the deletion cost of the primary non-blank candidate character of the set of non-blank candidate characters $CC_i$. In other embodiments, the deletion cost $W_{del}$("4") of the non-blank candidate character "4" is independent of the recognition score. In some of these embodiments, the deletion cost can be a fixed cost for all non-blank candidate characters, while in other embodiments, the deletion cost can vary based on which non-blank candidate character is to be deleted. In some embodiments, the delete cost can be set to a "not defined" value, such as a high value clearly outside the normal range for an edit cost.

Following the delete operation from cell (1,1) to cell (2,1), the optical string recognizer determines whether it can proceed from cell (2,1) to cell (2,2). In order to proceed from cell (2,1) to (2,2), the OSR 108 determines whether the distance between the candidate character at the first position of the candidate string and the candidate character at the third position of the candidate string satisfies the characteristics of the blank character in the model string 216. In some embodiments, in order to satisfy the characteristics of the blank character of model string 216, the OSR 108 determines whether the distance in the acquired image 212 between the two candidate characters "1" and "A" is not smaller than the minimum length of the blank character and not greater than the maximum length of the blank character. In some embodiments the distance between two candidate characters extracted from an image is determined based on the coordinates of each candidate character within the image.

In the illustrated example of FIG. 3A, the OSR 108 determines that the characteristics of the blank character are satisfied and the distance between the candidate character "1" of string 214D and the candidate character "A" of string 214D is within the minimum and the maximum lengths of the blank character of the model string 216. Therefore the OSR 108 moves to cell (2,2).

In some embodiments, the OSR 108 moves to cell (2,2) by performing an insert_blank operation. In FIG. 3A, the horizontal arrow originating from the cell (2,1) towards the cell (2,2) represents the insert_blank operation when performed at this position. The edit cost for proceeding from cell (2,1) towards cell (2,2) with an insert_blank operation is $D_{214D}$ (2,1)+$W_{insert\_blank}$. In some embodiments the cost of inserting a blank $W_{insert\_blank}$ is negligible (substantially zero or zero) and therefore the cost of proceeding from cell (2,1) to cell (2,2) is $D_{214D}$ (2,1). In other embodiments, the cost of inserting a blank can be set to a predetermined value (e.g., 0.5, 1, etc. or high value). Given that the only path available for reaching cell (2,2) is through a delete operation and an insert_blank operation, the minimum edit cost ($D_{214D}$ (2,2)) determined at cell (2,2) is equal to $D_{214D}$(2,1)+$W_{insert\_blank}$.

The OSR 108 continues with the process of determining the minimum edit cost between the model string 216 and the candidate string 214D. The arrow from cell (2,2) to cell (3,3) and the arrow from cell (3,3) to cell (4,4) represent the keep operations performed to respectively keep the letter "A" at the third position in the candidate string 214D and the number "5" at the fourth position of the candidate string 214D in order to obtain an output string that satisfies the characteristics of the model string 216.

In some embodiments, once the minimum edit cost of transforming the candidate string 214D to satisfy the characteristics of the model string 216 is computed, an output string corresponding to the determined minimum edit cost is returned. In some embodiments, this is performed by determining the set of edit operations corresponding to the minimum edit cost, performing the set of edit operations (if any) on the candidate string to obtain a revised candidate string, and returning an output string corresponding to the revised candidate string. In some embodiments, the output string includes for each output character position j a reference to a respective primary candidate character Mj of the revised candidate string and, optionally, related information such as the character model CMj that was matched and its label Lj, a position Xj of the match in the acquired image, and the recognition score RSj.

In other embodiments, the output string includes for each output character the position and the label Lj of the model character that was matched. In an embodiment, the determination of a set of edit operations corresponding to the minimum edit cost comprises backtracking through the dynamic programming array, as known from existing string recognition systems. However, any suitable method may be used to determine the set of edit operations corresponding to the minimum edit distance between the candidate string and the model string, without departing from the scope of the present invention.

In the example of FIG. 3A, backtracking through the dynamic programming array results in the identification of the following edit operations performed on the candidate string 214D: keep ("1"), delete ("4"), insert_blank, keep ("A"), and keep("5"), which correspond to the set of edit operations performed in order to compute the minimum edit cost $D_{214D}$(4,4). In particular, and specific to this non-limiting example, $D_{214D}$ (4,4)=$W_{keep}$ ("1")+$W_{del}$("4")+ $W_{insert\_blank}$+$W_{keep}$ ("A")+$W_{keep}$ ("5"). In this example, while the OSR 108 has determined a set of operations that transform the character string 214D into an output string (1 A5) that satisfies the characteristics of the model string 216, the minimum edit cost associated with this transformation is significantly increased by the deletion operation performed in order to satisfy the characteristics of the blank character at the second position of the model string 216. Therefore the presence of a blank character in the model string is a strong criteria that needs to be satisfied by a candidate string in order to match the model string. Forcing a deletion of a character and associating a relatively high score to this operation enables the increase of the likelihood that the OSR 108 will discard the candidate string 214D as a match for the model string 216.

FIG. 3B illustrates an exemplary dynamic programming array (DPA) for performing dynamic programming to compute the minimum edit cost between a candidate string 214B and a model string 216, in accordance with some embodiments. The OSR 108 computes a minimum edit cost between the candidate string 214B and the model string 216. Similarly to the non-limiting example of candidate string 214D discussed with reference to FIG. 3A above, candidate string 214B includes a non-blank candidate character "I" at the second position of the candidate string that is associated with the second position of the model string 216 at which there is a blank character. In the same manner as described above in order to move from cell (1,1) to cell (2,2) the OSR 108 is to perform a delete operation and move down towards the cell (2,1) with an associated cost for deleting the candidate character at that position $W_{del}$("I"). However, in contrast to the example of FIG. 3A, once the deletion of the character is performed, the OSR 108 is not allowed to insert a blank character as the distance between the candidate character in the first position of the candidate string and the candidate character at the third position in the candidate string is determined to not satisfy the characteristics of the blank character of the model string 216.

The distance between the "1" and the "8" in the candidate string 214B is determined to be smaller than the minimum length defined for the blank character of the model string 216. Therefore the OSR 108 is further to delete another character in order to create additional space (blank) between two non-blank candidate characters in the candidate string 214B and satisfy the characteristics of the model string 216. Thus following the deletion of the candidate character "I" at the second position of the candidate string 214B, the OSR 108 proceeds to cell (2,1), and upon determination that an additional deletion is needed, it proceeds to cell (3,1) and calculates the edit cost for reaching cell (3,1). The edit cost for proceeding from cell (2,1) towards cell (3,1) is $D_{214B}$(2,1)+$W_{del}$ ("8").

In some embodiments, and as described above with reference to the delete operation of a non-blank candidate character, the deletion costs $W_{del}$("I") and $W_{del}$("8") is an increasing function of the recognition score of each respective character $RS_{214B}$(" "), $RS_{214B}$("8"). For example, $W_{del}$("I")=$RS_{214B}$("I") and $W_{del}$("8")=$RS_{214B}$("8"). In some embodiments, the deletion cost is the deletion cost of the primary non-blank candidate character of the set of non-blank candidate characters $CC_i$. In other embodiments, the deletion costs $W_{del}$("I") and $W_{del}$("8") of the non-blank candidate characters are independent of the recognition score. In some of these embodiments, the deletion cost can be a fixed cost for all non-blank candidate characters, while in other embodiments, the deletion cost can vary based on which non-blank candidate character is to be deleted. In some embodiments, the delete cost can be set to a "not defined" value, such as a high value clearly outside the normal range for an edit cost.

Following the delete operation from cell (2,1) to cell (3,1), the optical string recognizer determines whether it can proceed from cell (3,1) to cell (3,2). In order to proceed from cell (3,1) to (3,2), the OSR 108 determines whether the distance between the candidate character at the first position of the candidate string and the candidate character at the fourth position of the candidate string satisfies the characteristics of the blank character in the model string 216. The OSR 108 determines whether the distance in the acquired image 212 between the two candidate characters "1" and "A" of the candidate string 214B is not smaller than the minimum length of the blank character and is not greater than the maximum length of the blank character. At this point (following the deletion of the candidate characters "I" and "8"), the OSR 108 determines that the characteristics of the blank character are satisfied and the distance between the candidate character "1" and the candidate character "A" of string 214B is greater than the minimum length of the blank character and smaller than the maximum length of the blank character of the model string 216. Therefore the OSR 108 moves to cell (3,2). In some embodiments, if the distance between the candidate character "1" and the candidate character "A" of string 214B is greater than the maximum length defined for the blank character of the model string 216, OSR 108 determines that the insert blank operation cannot be performed as the string cannot converge towards the model string 216.

In some embodiments, the OSR 108 moves to cell (3,2) by performing an insert_blank operation. In FIG. 3B, the horizontal arrow originating from cell (3,1) towards cell (3,2) represents the insert_blank operation when performed at this position. The edit cost for proceeding from cell (3,1) towards cell (3,2) is equal to $D_{214B}$(3,1)+$W_{insert\_blank}$. In some embodiments the cost of inserting a blank $W_{insert\_blank}$ is negligible (substantially zero or zero) and therefore the cost of proceeding from cell (3,1) to cell (3,2) is $D_{214B}$(3,1). In other embodiments, the cost of inserting a blank can be set to a predetermined high value (e.g., 0.5, 1, etc. or high value). For example, when the cost of an operation to be performed on a candidate character $M_k$ is set to be between [0,1] (e.g., when the cost is a function of the recognition score $RS_k$ of the candidate character), the cost of the insert_blank operation can be set to a value of an integer higher than 1 (e.g., 2, 3, . . . 10) consequently significantly increasing the edit cost between the model string and the candidate string.

The OSR 108 continues with the process of determining the minimum edit cost between the model string 216 and the candidate string 214B. The arrow from cell (3,2) to cell (4, 3) and the arrow from cell (4,3) to cell (5,4) represent the keep operations performed to respectively keep the letter "A" at the fourth position in the candidate string 214B and the number "5" at the fifth position of the candidate string 214B in order to obtain an output string that satisfies the characteristics of the model string 216. Once the minimum edit cost $D_{214B}$(5,4) of transforming the candidate string 214B to satisfy the characteristics of the model string 216 is performed, an output string corresponding to the determined minimum edit cost is returned. In some embodiments, the operations performed to obtain the output string are also returned.

In the example of FIG. 3B, backtracking through the dynamic programming array results in the identification of the following edit operations performed on the candidate string 214B: keep ("1"), delete ("I"), delete ("8"), insert_blank, keep ("A"), and keep ("5"), which correspond to the set of edit operations performed in order to compute the minimum edit cost $D_{214B}$(5,4). In particular, and specific to this non-limiting example, $D_{214B}$(5,4)=$W_{keep}$ ("1")+$W_{del}$ ("I")+$W_{del}$ ("8")+$W_{insert\_blank}$+$W_{keep}$ ("A")+$W_{keep}$ ("5"). In this example, while the OSR 108 has determined a set of operations that transform the character string 214B into an output string (1 A5) that satisfies the characteristics of the model string 216, the minimum edit cost associated with this transformation is significantly increased by the two deletion operations performed in order to satisfy the characteristics of the blank character at the second position of the model string 216. Therefore the presence of a blank character in the model string is a strong criteria that needs to be satisfied by a candidate string in order to match the model string. Forcing a deletion of a character and associating a relatively high score to this operation enables the increase of the likelihood that the OSR 108 will discard the candidate string 214B as a match for the model string 216.

FIG. 3C illustrates an exemplary dynamic programming array (DPA) for performing dynamic programming to compute the minimum edit cost between a candidate string 214C and a model string 216, in accordance with some embodiments. While in this third example, the candidate string appears similar to the model string 216, the blank character at the second position of the candidate string 214C does not satisfy the characteristics of the blank character in the model string 216. The distance between the candidate character "1" at the first position of candidate string 214C and the candidate character "A" at the third position of candidate string 214C is determined to be smaller than the minimum length of the blank character of the model string 216. Therefore, similarly to the example of FIG. 3B, there is a need to perform two successive delete operations from cell (1,1) to cell (2,1) and from cell (2,1) to cell (3,1) with associated edit costs. In some embodiments, the cost of a delete_blank operation is set to 1. In some embodiments, the cost of a delete_blank is $1-W_{keep\_blank}$. However as opposed to the two preceding examples of FIGS. 3A and 3B where the candidate string converged towards an output string that satisfies the characteristics of the model string 216 (with associated high values of the minimum edit costs), once the successive operations are performed the output string cannot converge towards the model string 216. As it is illustrated in FIG. 3C, once the cell (3,2) is reached (following a delete (blank), delete ("A") and insert_blank operations), the two potential operations that can be performed are a delete of the last candidate character "5" or a keep of this character (however if a keep is performed, the candidate character "5" does not satisfy the characteristics of the model character at that position which is a set of letter characters (A-Z)). This will cause the output string for the candidate string 214C to be immediately discarded.

FIG. 3D illustrates an exemplary dynamic programming array (DPA) for performing dynamic programming to compute the minimum edit cost between a candidate string 214A and a model string 216 when the candidate string and the model string include a blank at a corresponding location, in accordance with some embodiments. In this example, the blank character located at the second position of the candidate string 214A satisfies the characteristics of the blank character of the model string 216. The distance between the "1" and the "A" in the candidate string 214A is not smaller than the minimum length defined for the blank character of the model string 216 and not greater than the maximum length defined for the blank character of the model string 216. Further while the character "S" at the fourth position in the candidate string is a primary candidate character that resulted from the OCR process with a highest recognition score associated for this character, the OCR process may have also identified a secondary candidate character that could be a match at that position in the image. For example, the secondary candidate character can be a "5" with an associated recognition score $RS_{214A}$("5").

In this embodiment, when the cell (1,1) is reached, the OSR 108 determines that the characteristics of the blank character from the model string are satisfied and proceeds to cell (2,2) to calculate the edit cost $D_{214A}(2,2)$. The edit cost to move from cell (1,1) to cell (2,2) is $D_{214A}(1,1)+W_{keep}$ (BLANK). The cost of keeping a blank character that satisfies the characteristics of the blank character of the model string is null. Consequently the edit cost to move from cell (1,1) to cell (2,2) is $D_{214A}(1,1)$. Thus as opposed to the examples of FIGS. 3A, 3B and 3C where delete operations significantly increased the minimum edit cost associated with a candidate string, when a blank character that satisfies the characteristics of a blank in a model string is detected, there is zero cost associated with the blank character resulting in a strong correlation established between the model string and the candidate string at that position.

The OSR 108 continues with the process of determining the minimum edit cost between the model string 216 and the candidate string 214A. The arrow from cell (2,2) to cell (3,3) and the arrow from cell (3,3) to cell (4,4) represent the keep operations performed to respectively keep the letter "A" at the third position in the candidate string 214A and replace the candidate character "S" with the number "5" at the fourth position of the candidate string 214A in order to obtain an output string that satisfies the characteristics of the model string 216.

In some embodiments, once the minimum edit cost of transforming the candidate string 214A to satisfy the characteristics of the model string 216 is performed, an output string corresponding to the determined minimum edit cost is returned. In the example of FIG. 3D, backtracking through the dynamic programming array results in the identification of the following edit operations performed on the candidate string 214A: keep ("1"), keep (BLANK), keep ("A"), and keep("5"), which correspond to the set of edit operations performed in order to compute the minimum edit cost $D_{214A}(4,4)$. In particular, and specific to this non-limiting example, $D_{214A}(4,4)=W_{keep}("1")+W_{keep}("A")+W_{keep}("5")$ (given that the cost for keeping the BLANK is zero).

Therefore the presence of a blank character in the model string is a strong criteria that needs to be satisfied by a candidate string in order to match the model string. Forcing a deletion of a character and associating a relatively high score to this operation, enables the increase of the likelihood that the OSR 108 will discard the candidate string 214D as a match for the model string 216. In contrast, when a blank character that satisfies characteristics of a blank model character is identified at a corresponding position of the blank model character in the model string, the cost of keeping the blank candidate character is zero providing a strong correlation between the two strings at that location.

In particular, in an embodiment where the costs of the operations are based on a recognition score of a character in the image, the cost of a keep operation is typically a non-zero value. In fact, when a character matches a model character with a high recognition score RS (for example, character "1" in the candidate string 214B has a high recognition score $RS_{214B}$ ("1")), the cost of keeping this character is $W_{keep}=1-RS$. While 1-RS will tend towards zero, it is highly improbable that the value zero is actually attained. In contrast, when a blank character is detected at a position in the candidate string that corresponds with a position of the blank in the model string, the cost of the keep is zero. Consequently this provides a strong indication that there is correlation between these two positions and significantly improves the minimum edit cost for the string and the determination of the best match within the image for the model string. In some embodiments, the cost of keeping the blank character can be a predetermined value that is different from zero.

In some embodiments, when the minimum edit costs of each candidate string (214A-F) is computed with respect to the model string 216, a determination is performed of which candidate string presents the better match for the model string. According to the non-limiting example presented with respect to FIGS. 2, 3A-D, the candidate string with the lowest minimum edit cost is selected, i.e., candidate string 214A.

Therefore the embodiments of the present invention present clear advantages with respect to prior approaches for detecting strings in an image. By enabling specific operations and costs for the management and handling of blank characters included in the model string, the embodiments allow for a more efficient and more accurate recognition of strings in an image. In some embodiments the detection of a non-blank character in a candidate string at a position where a blank character is located within the model string causes the deletion of the non-blank character by significantly increasing the minimum edit cost associated with the candidate string and consequently increasing the likelihood that the candidate string will be discarded.

While the embodiments of the present invention were illustrated with a single model string, other embodiments may include several model strings defined. Each model string may have different characteristics (e.g., different number of characters, be a mix of predefined characters and character sets, include only character sets, etc.). Further the characteristics of a blank character (e.g., minimum and maximum length) can be defined to be the same for all model strings or, alternatively, each model string can have a blank character with respective characteristics that are different from the characteristics of the blank characters of the other model strings.

Figure 4:
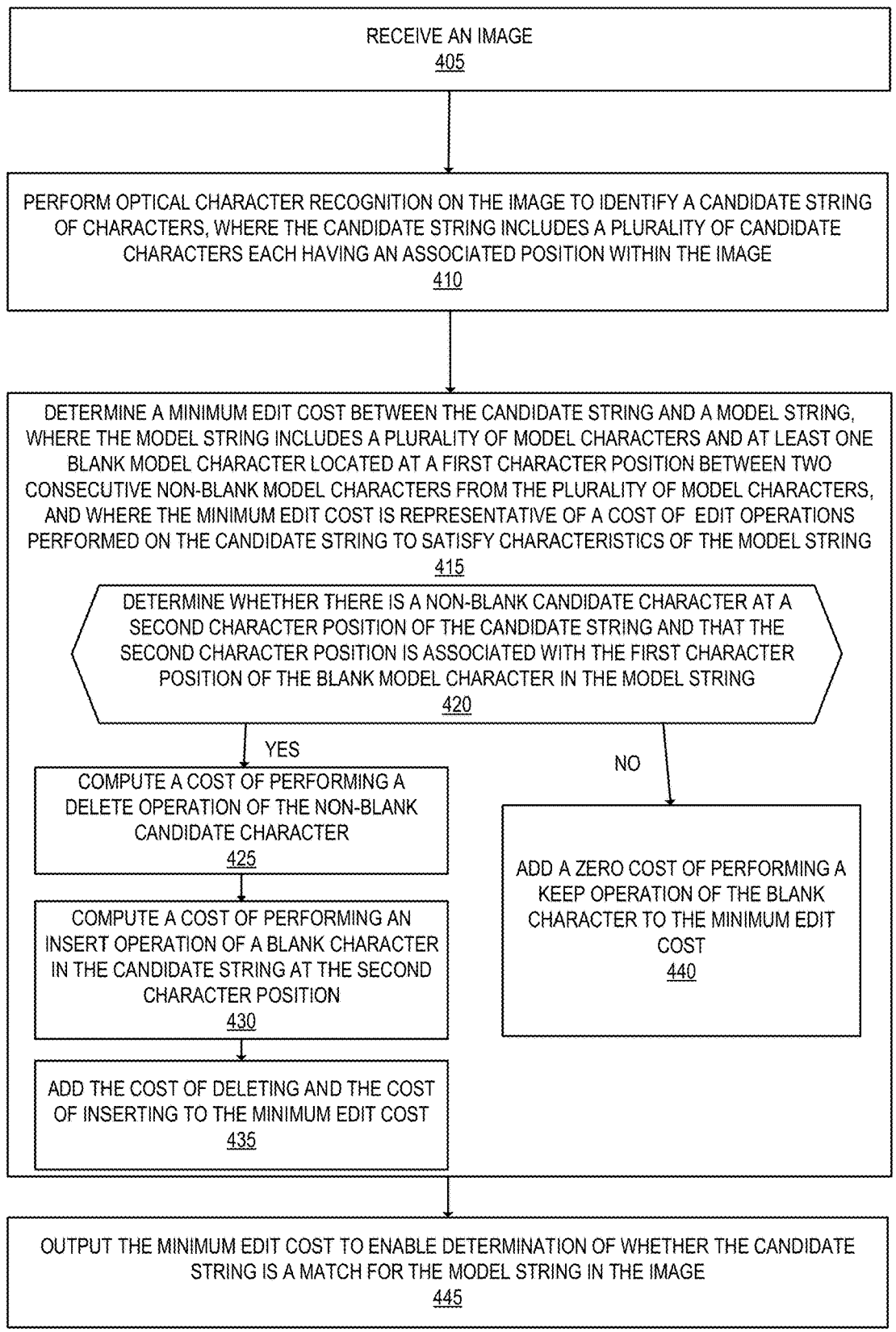
FIG. 4 illustrates a flow diagram of exemplary operations for processing candidate strings detected in an image to identify a match of a model string in the image when the model string includes a blank character, in accordance with some embodiments.

FIG. 4 illustrates a flow diagram of exemplary operations for processing candidate strings detected in an image to identify a match of a model string in the image. At operation 405, an image is received. At operation 410, optical character recognition is performed on the image to identify a candidate string of characters. The candidate string includes a plurality of candidate characters each having an associated position within the image. Flow then moves to operation 415, at which a minimum edit cost is determined between the candidate string and a model string. The model string includes a plurality of model characters and at least one blank model character located at a first character position between two consecutive non-blank model characters from the plurality of model characters. The minimum edit cost is representative of a cost of edit operations performed on the candidate string to satisfy characteristics of the model string.

Flow then moves to operation 420, at which a determination is performed of whether there is a non-blank candidate character at a second character position of the candidate string and that the second character position is associated with the first character position of the blank model character in the model string. Responsive to determining that there is a non-blank candidate character at a second character position of the candidate string and that the second character position is associated with the first character position of the blank model character in the model string, the flow moves to operation 425, at which a cost of performing a delete operation of the non-blank candidate character from the candidate string is computed. Flow then moves to operation 430, at which a cost of performing an insert operation of a blank character in the candidate string at the second character position is computed. Flow moves to operation 435, at which the cost of deleting and the cost of inserting is added to the minimum edit cost. Alternatively responsive to determining that there is a blank candidate character at a second character position of the candidate string and that the second character position is associated with the first character position of the blank model character in the model string, the flow moves to operation 440, at which a zero cost of performing a keep operation is added to the minimum edit cost. Flow then moves to operation 445, at which the minimum edit cost is output to enable determination of whether the candidate string is a match for the model string in the image.

The minimum edit cost of the candidate string can be compared with the costs of other candidate strings, and the candidate with the lowest cost is selected as a match for a model string. Alternatively, or additionally, the minimum edit cost of the candidate string can be compared to a threshold value, and the candidate string is selected as a match if the minimum edit cost satisfies the threshold value.

In some embodiments, the candidate string extracted from an image includes a blank character between two candidate characters at a given candidate position, whereas the model string does not include a blank character at the corresponding character position. The embodiments of the present invention provide a mechanism for enabling the OSR 108 to immediately discard a candidate string upon determination that it includes a blank character at a character position corresponding to a position of a non-blank character in the model string. In these embodiments, the minimum edit cost between the candidate string and the model string is determined. While the embodiments are described with a dynamic programming array for performing dynamic programming to compute a minimum edit cost, in other embodiments other implementations of dynamic programming can be used for calculating the minimum edit cost between two strings.

FIG. 5 illustrates an exemplary dynamic programming array (DPA) for performing dynamic programming to compute the minimum edit cost between a candidate string 514A (string "2 M7") and a model string 516 (e.g., string "2K(A-Z)(0-9)") when the candidate string includes a blank character, in accordance with some embodiments.

Similarly to the embodiments described above, the string 514A is a result of optical character recognition performed on an image received from an acquisition device. The candidate string includes a plurality of candidate characters each having an associated position within the image. The candidate string 514A is determined to include a blank character at the second position. A minimum edit cost between the candidate string 514A and the model string 516 is determined through the dynamic programming array. The model string 516 includes a set of model characters at respective model character positions.

When the cell (1,1) is reached in the DPA a minimum edit cost $D_{514A}(1,1)$ is calculated. Given that an insert operation is not allowed, the only path available to reach cell (1,1) from cell (0,0) is to perform a keep operation of the candidate character at position 1, character "2". Given that this operation is the first operation performed in the calculation of the minimum edit cost between the strings, the distance equals the cost of the keep operation (i.e., $D_{514A}(1,1)=W_{keep}("2")$). Once the cell (1,1) is reached, the optical string recognizer 108 determines if it is possible to modify the candidate string in order to obtain the model character at position 2 of the model string 516 (i.e., character "K") when originating from the cell (1,1).

The optical string recognizer 108 determines that the candidate string includes at the corresponding position of the candidate string (i.e., here at the second position of the candidate string) a blank character. When it is determined that a blank character in the candidate string is located at an associated position of a non-blank character of the model string, the optical string recognizer 108 does not allow the use of a keep/replace operation (which would otherwise lead to a replacement of the blank character with a non-blank character), nor does it allow for an insert operation (which would insert a new non-blank character at the position of the blank candidate character). Therefore the OSR 108 determines that the minimum edit cost cannot be computed between the model string and the candidate string 514A and that there are no operations possible to transform the candidate string 514A into model string 516.

Figure 6:
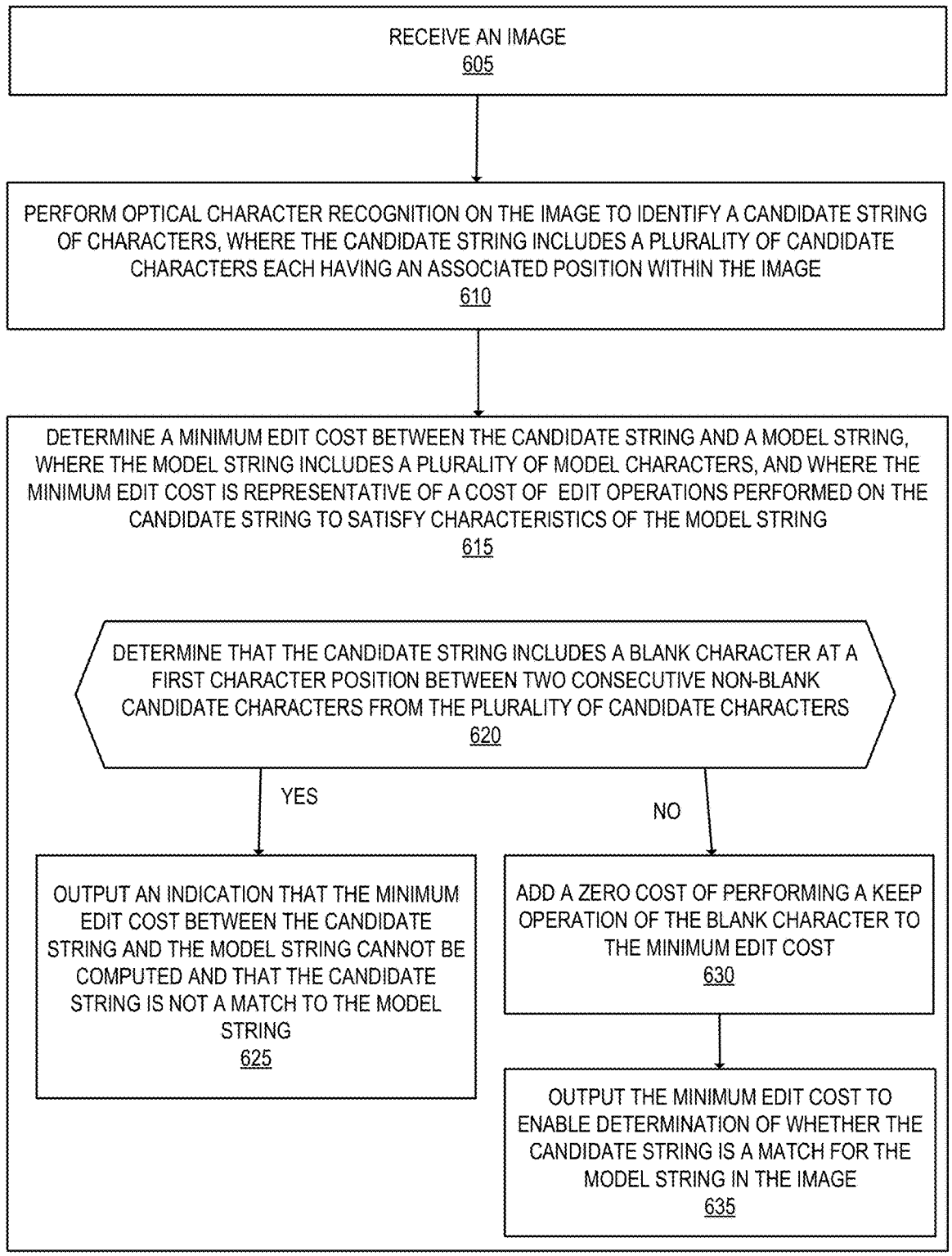
FIG. 6 illustrates a flow diagram of exemplary operations for processing candidate strings detected in an image to identify a match of a model string in the image when the candidate string includes a blank character, in accordance with some embodiments.

FIG. 6 illustrates a flow diagram of exemplary operations for processing candidate strings detected in an image to identify a match of a model string in the image when the candidate string includes a blank character, in accordance with some embodiments. At operation 605, an image is received. At operation 610, optical character recognition is performed on the image to identify a candidate string of characters. The candidate string includes a plurality of candidate characters each having an associated position within the image. At operation 615, a minimum edit cost between the candidate string and a model string is determined. The model string includes a set of model characters, and the minimum edit cost is representative of a cost of edit operations performed on the candidate string to satisfy characteristics of the model string. In some embodiments, determining the minimum edit cost includes determining, at operation 620, that the candidate string includes a blank character at a first character position between two consecutive non-blank candidate characters from the plurality of candidate characters. In response to determining that there is a non-blank model character at a second character position of the model string and that the second character position is associated with the first character position of the blank character in the candidate string, flow moves to operation 625 at which an indication that the minimum edit cost between the candidate string and the model string cannot be computed and that the candidate string is not a match to the model string is output. Alternatively, in response to determining that there is a blank model character at a second character position of the model string and that the second character position is associated with the first character position of the blank character in the candidate string, flow moves to operation 630 at which a zero cost of performing a keep operation of the blank character is added to the minimum edit cost. Flow then moves to operation 635, at which the minimum edit cost is output. The minimum edit cost enables determination of whether the candidate string is a match for the model string in the image.

Architecture

Figure 7:
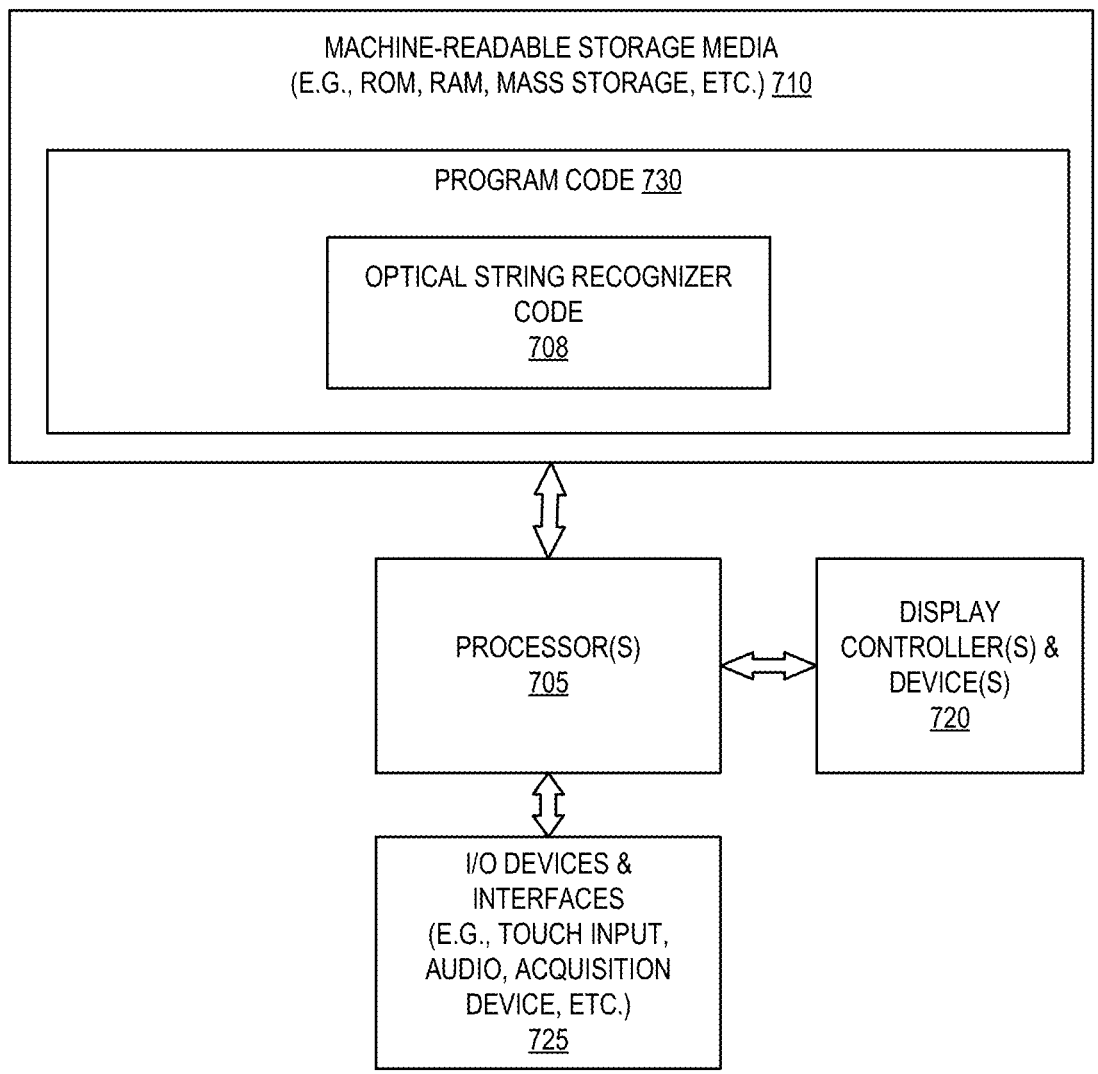
FIG. 7 is a block diagram illustrating an exemplary data processing system that may be used in some embodiments.

FIG. 7 illustrates a block diagram for an exemplary data processing system 1000 that may be used in some embodiments. Data processing system 1000 includes one or more processors 705 and connected system components (e.g., multiple connected chips). Alternatively, the data processing system 1000 is a system on a chip or Field-Programmable gate array. One or more such data processing systems 1000 may be utilized to implement the functionality of the optical string recognizer 108 as illustrated in FIGS. 1-6.

The data processing system 1000 is an electronic device which stores and transmits (internally and/or with other electronic devices over a network) code (which is composed of software instructions and which is sometimes referred to as computer program code or a computer program) and/or data using machine-readable media (also called computer-readable media), such as machine-readable storage media 710 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processor(s) 705. For example, the depicted machine-readable storage media 710 may store program code 730 that, when executed by the processor(s) 705, causes the data processing system 1000 to perform efficient and accurate identification of strings in an image. For example, the program code 730 may include optical string recognizer code 708, which when executed by the processor(s) 705, causes the data processing system 1000 to perform the operations described with reference to FIGS. 1-6.

Thus, an electronic device (e.g., a computer or an FPGA) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The data processing system 1000 may also include a display controller and display device 720 to provide a visual user interface for the user, e.g., GUI elements or windows. The visual user interface may be used to enable a user to input parameters to the optical string recognizer 108, to view results of the string identification, or any other task.

The data processing system 1000 also includes one or more input or output ("I/O") devices and interfaces 725, which are provided to allow a user to provide input to, receive output from, and otherwise transfer data to and from the system. These I/O devices 725 may include a mouse, keypad, keyboard, a touch panel or a multi-touch input panel, camera, frame grabber, optical scanner, an audio input/output subsystem (which may include a microphone and/or a speaker for, for example, playing back music or other audio, receiving voice instructions to be executed by the processor(s) 705, playing audio notifications, etc.), other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 1000.

The I/O devices and interfaces 725 may also include a connector for a dock or a connector for a USB interface, FireWire, Thunderbolt, Ethernet, etc., to connect the system 1000 with another device, external component, or a network. Exemplary I/O devices and interfaces 725 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the data processing system 1000 with another device, external component, or a network and receive stored instructions, data, tokens, etc. It will be appreciated that one or more buses may be used to interconnect the various components shown in FIG. 7.

It will be appreciated that additional components, not shown, may also be part of the system 1000, and, in certain embodiments, fewer components than that shown in FIG. 7 may also be used in a data processing system 1000. For example, in some embodiments the data processing system 1000 may include or be coupled with an image acquisition device for acquiring images.

While the embodiments are described with the optical string recognizer 108 performing the OCR mechanism, in other embodiments, the OCR can be performed externally to the optical string recognizer 108. In these embodiments, the optical string recognizer 108 is operative to receive a set of one or more candidate strings (where the characters are as machine-encoded text) which were extracted from an image as a result of OCR. In other embodiments, the optical string recognizer (OSR) 108 is operative to perform at least the segmentation stage of the OCR. In these embodiments, the OSR 108 receives a set of characters (as a result of a character extraction within the image and segments the characters into one or more strings based on the stringness criteria.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense. For example, while the flow diagrams in the figures show a particular order of operations performed by certain embodiments of the invention, it should be understood that such order is exemplary. One having ordinary skill in the art would recognize that variations can be made to the flow diagrams without departing from the broader spirit and scope of the invention as set forth in the following claims (e.g., alternative embodiments may perform the operations in a different order, combine certain operations, overlap certain operations, etc.).

Some portions of the preceding detailed descriptions have been presented in terms of algorithms and symbolic representations of transactions on data bits within a computer and memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

What is claimed is:

1. A method of identifying a match of a model string in an image, the method comprising:

receiving the image;

performing optical character recognition on the image to identify a candidate string of characters, wherein the candidate string includes a plurality of candidate characters each having an associated position within the image; and determining a minimum edit cost between the candidate string and the model string, wherein the model string includes a plurality of model characters, and wherein the minimum edit cost is representative of a cost of edit operations performed on the candidate string to satisfy characteristics of the model string, wherein determining the minimum edit cost includes:

determining that the candidate string includes a blank character at a first character position between two consecutive non-blank candidate characters from the plurality of candidate characters, and responsive to determining that there is a non-blank model character at a second character position of the model string and that the second character position is associated with the first character position of the blank character in the candidate string, outputting an indication that the minimum edit cost between the candidate string and the model string cannot be computed and that the candidate string is not a match to the model string.

2. The method of claim 1, wherein the candidate string is a first candidate string identified in the image, and the model string includes at least one blank model character located at a fourth character position between two consecutive non-blank model characters from the plurality of model characters, and performing optical character recognition on the image is further to identify a second candidate string in the image, wherein the second candidate string includes a blank candidate character at a third character position between two consecutive non-blank candidate characters, wherein the method further comprises:
  determining a second minimum edit cost between the second candidate string and the model string, which includes:
    responsive to determining that the third character position is associated with the fourth character position of the blank model character in the model string, adding a zero cost of performing a keep operation of the blank candidate character in the second candidate string to the second minimum edit cost between the second candidate string and the model string; and
  outputting the second minimum edit cost to enable determination of whether the second candidate string is a match for the model string in the image.

3. The method of claim 1, wherein determining that the candidate string includes the blank character at the first character position includes:
  determining a distance between the two consecutive non-blank candidate characters; and
  determining that the distance between the two consecutive non-blank candidate characters satisfies characteristics of a blank character defined for the model string.

4. The method of claim 3, wherein a minimum length and a maximum length of the blank character defined for the model string are defined for the model string, and the determining that the distance between the two consecutive non-blank candidate characters satisfies characteristics of the blank character defined for the model string includes:
  determining that the distance between the two consecutive non-blank candidate characters is greater than the minimum length; and
  determining that the distance between the two consecutive non-blank candidate characters is smaller than the maximum length.

5. The method of claim 3, wherein the model string is one of a plurality of model strings and the characteristics of the blank character are defined to be the same for the plurality of model strings.

6. The method of claim 3, wherein the model string is one of a plurality of model strings, and wherein the characteristics of the blank character are defined for the model string and are different from characteristics of blank characters defined for other model strings from the plurality of model strings.

7. The method of claim 1, wherein the model string is a template string having an associated plurality of character positions, each character position being associated with one of a blank character and a character set defining a set of allowable model characters for a respective character position in the candidate string, and wherein the candidate string is to satisfy characteristics of a model string when each candidate character from the candidate string at a given position is at least one of a blank character or part of a character set at the respective character position in the template string.

8. The method of claim 1, further comprising:
  responsive to determining that there is a blank model character at the second character position of the model string and that the second character position is associated with the first character position of the blank character in the candidate string, adding a zero cost of performing a keep operation of the blank character in the candidate string to the minimum edit cost between the candidate string and the model string and outputting the minimum edit cost to enable determination of whether the candidate string is a match for the model string in the image.

9. An image processing device comprising:
  a non-transitory computer readable medium to store instructions; and
  a processor coupled with the non-transitory computer readable medium to process the stored instructions to:
    receive an image,
    perform optical character recognition on the image to identify a candidate string of characters, wherein the candidate string includes a plurality of candidate characters each having an associated position within the image, and
    determine a minimum edit cost between the candidate string and a model string, wherein the model string includes a plurality of model characters, and wherein the minimum edit cost is representative of a cost of edit operations performed on the candidate string to satisfy characteristics of the model string, wherein to determine the minimum edit cost includes:
      determine that the candidate string includes a blank character at a first character position between two consecutive non-blank candidate characters from the plurality of candidate characters, and
      responsive to determining that there is a non-blank model character at a second character position of the model string and that the second character position is associated with the first character position of the blank character in the candidate string, output an indication that the minimum edit cost between the candidate string and the model string cannot be computed and that the candidate string is not a match to the model string.

10. The image processing device of claim 9, wherein the candidate string is a first candidate string identified in the image, and the model string includes at least one blank model character located at a fourth character position between two consecutive non-blank model characters from the plurality of model characters, and to perform optical character recognition on the image is further to identify a second candidate string in the image, wherein the second candidate string includes a blank candidate character at a third character position between two consecutive non-blank candidate characters, wherein the processor is further to:
  determine a second minimum edit cost between the second candidate string and the model string, which includes:
    responsive to determining that the third character position is associated with the fourth character position of the blank model character in the model string, add a zero cost of performing a keep operation of the blank candidate character in the second candidate string to the second minimum edit cost between the second candidate string and the model string; and
  output the second minimum edit cost to enable determination of whether the second candidate string is a match for the model string in the image.

11. The image processing device of claim 9, wherein determining that the candidate string includes the blank character at the first character position includes:
  determine a distance between the two consecutive non-blank candidate characters; and
  determine that the distance between the two consecutive non-blank candidate characters satisfies characteristics of a blank character defined for the model string.

12. The image processing device of claim 11, wherein a minimum length and a maximum length of the blank character defined for the model string are defined for the model string, and to determine that the distance between the two consecutive non-blank candidate characters satisfies characteristics of the blank character defined for the model string includes to:
- determine that the distance between the two consecutive non-blank candidate characters is greater than the minimum length; and
- determine that the distance between the two consecutive non-blank candidate characters is smaller than the maximum length.

13. The image processing device of claim 11, wherein the model string is one of a plurality of model strings and the characteristics of the blank character are defined to be the same for the plurality of model strings.

14. The image processing device of claim 11, wherein the model string is one of a plurality of model strings, and wherein the characteristics of the blank character are defined for the model string and are different from characteristics of blank characters defined for other model strings from the plurality of model strings.

15. The image processing device of claim 9, wherein the model string is a template string having an associated plurality of character positions, each character position being associated with one of a blank character and a character set defining a set of allowable model characters for a respective character position in the candidate string, and wherein the candidate string is to satisfy characteristics of a model string when each candidate character from the candidate string at a given position is at least one of a blank character or part of a character set at the respective character position in the template string.

16. The image processing device of claim 9, wherein the processor is further to:
- responsive to determining that there is a blank model character at the second character position of the model string and that the second character position is associated with the first character position of the blank character in the candidate string, add a zero cost of performing a keep operation of the blank character in the candidate string to the minimum edit cost between the candidate string and the model string and outputting the minimum edit cost to enable determination of whether the candidate string is a match for the model string in the image.

17. A non-transitory computer readable storage medium that provides instructions, which when executed by a processor, cause said processor to perform operations comprising:
- receiving an image,
- performing optical character recognition on the image to identify a candidate string of characters, wherein the candidate string includes a plurality of candidate characters each having an associated position within the image, and
- determining a minimum edit cost between the candidate string and a model string, wherein the model string includes a plurality of model characters, and wherein the minimum edit cost is representative of a cost of edit operations performed on the candidate string to satisfy characteristics of the model string, wherein determining the minimum edit cost includes:
  - determining that the candidate string includes a blank character at a first character position between two consecutive non-blank candidate characters from the plurality of candidate characters, and
  - responsive to determining that there is a non-blank model character at a second character position of the model string and that the second character position is associated with the first character position of the blank character in the candidate string, outputting an indication that the minimum edit cost between the candidate string and the model string cannot be computed and that the candidate string is not a match to the model string.

18. The non-transitory computer readable storage medium of claim 17, wherein the candidate string is a first candidate string identified in the image, and the model string includes at least one blank model character located at a fourth character position between two consecutive non-blank model characters from the plurality of model characters, and performing optical character recognition on the image is further to identify a second candidate string in the image, wherein the second candidate string includes a blank candidate character at a third character position between two consecutive non-blank candidate characters, and the operations further comprise:
- determining a second minimum edit cost between the second candidate string and the model string, which includes:
  - responsive to determining that the third character position is associated with the fourth character position of the blank model character in the model string, adding a zero cost of performing a keep operation of the blank candidate character in the second candidate string to the second minimum edit cost between the second candidate string and the model string; and
- outputting the second minimum edit cost to enable determination of whether the second candidate string is a match for the model string in the image.

19. The non-transitory computer readable storage medium of claim 17, wherein determining that the candidate string includes the blank character at the first character position includes:
- determining a distance between the two consecutive non-blank candidate characters; and
- determining that the distance between the two consecutive non-blank candidate characters satisfies characteristics of a blank character defined for the model string.

20. The non-transitory computer readable storage medium of claim 19, wherein a minimum length and a maximum length of the blank character defined for the model string are defined for the model string, and the determining that the distance between the two consecutive non-blank candidate characters satisfies characteristics of the blank character defined for the model string includes:
- determining that the distance between the two consecutive non-blank candidate characters is greater than the minimum length; and
- determining that the distance between the two consecutive non-blank candidate characters is smaller than the maximum length.

21. The non-transitory computer readable storage medium of claim 19, wherein the model string is one of a plurality of model strings and the characteristics of the blank character are defined to be the same for the plurality of model strings.

22. The non-transitory computer readable storage medium of claim 19, wherein the model string is one of a plurality of model strings, and wherein the characteristics of the blank character are defined for the model string and are different from characteristics of blank characters defined for other model strings from the plurality of model strings.

23. The non-transitory computer readable storage medium of claim 17, wherein the model string is a template string having an associated plurality of character positions, each character position being associated with one of a blank character and a character set defining a set of allowable model characters for a respective character position in the candidate string, and wherein the candidate string is to satisfy characteristics of a model string when each candidate character from the candidate string at a given position is at least one of a blank character or part of a character set at the respective character position in the template string.

24. The non-transitory computer readable storage medium of claim 17, wherein the operations further comprise:
responsive to determining that there is a blank model character at the second character position of the model string and that the second character position is associated with the first character position of the blank character in the candidate string, adding a zero cost of performing a keep operation of the blank character in the candidate string to the minimum edit cost between the candidate string and the model string and outputting the minimum edit cost to enable determination of whether the candidate string is a match for the model string in the image.

\* \* \* \* \*